United States Patent
Liu et al.

(10) Patent No.: US 8,885,524 B2
(45) Date of Patent: Nov. 11, 2014

(54) METHOD AND APPARATUS FOR NEGOTIATING MASTER STATION

(75) Inventors: Xilei Liu, Shenzhen (CN); Zhiming Ding, Shenzhen (CN); Yongli Yang, Shanghai (CN); Guiming Shu, Shenzhen (CN)

(73) Assignee: Huawei Device Co., Ltd., Shenzhen (CN)

( * ) Notice: Subject to any disclaimer, the term of this patent is extended or adjusted under 35 U.S.C. 154(b) by 734 days.

(21) Appl. No.: 13/157,118

(22) Filed: Jun. 9, 2011

(65) Prior Publication Data

US 2011/0235561 A1    Sep. 29, 2011

Related U.S. Application Data

(63) Continuation of application No. PCT/CN2009/075429, filed on Dec. 9, 2009.

(30) Foreign Application Priority Data

Dec. 9, 2008   (CN) .......................... 2008 1 0239133

(51) Int. Cl.
*H04B 7/005* (2006.01)
*H04W 4/00* (2009.01)
*H04L 12/24* (2006.01)
*H04W 84/20* (2009.01)
*H04L 29/14* (2006.01)

(52) U.S. Cl.
CPC .............. *H04L 41/30* (2013.01); *H04W 84/20* (2013.01); *H04L 69/40* (2013.01)
USPC ......................................... 370/278; 370/328

(58) Field of Classification Search
CPC ..... H04W 80/04; H04W 88/06; H04W 88/08; H04W 84/18; H04W 84/12; H04W 74/08
USPC .................................................. 370/310–350
See application file for complete search history.

(56) References Cited

U.S. PATENT DOCUMENTS

2002/0055978 A1 *   5/2002   Joon-Bo et al. ............... 709/209
2004/0128387 A1     7/2004   Chin et al.
(Continued)

FOREIGN PATENT DOCUMENTS

CN   1459725 A   12/2003
CN   1747404 A    3/2006
(Continued)

OTHER PUBLICATIONS

Chinese Office Action received in Application No. 200810239133.9 mailed Nov. 22, 2013, 38 pages.

(Continued)

*Primary Examiner* — Warner Wong
(74) *Attorney, Agent, or Firm* — Slater & Matsil, L.L.P.

(57) ABSTRACT

A method and an apparatus for negotiating a master station are disclosed. The method includes receiving from a master station a management frame that carries a master identity; obtaining a maximum time interval between receiving of the management frame and receiving of a next management frame from the master station; and determining, according to a preset policy, a local station itself as a new master station if no more management frame is received after the maximum time interval.

20 Claims, 5 Drawing Sheets

(56) References Cited

U.S. PATENT DOCUMENTS

| | | | |
|---|---|---|---|
| 2004/0252637 A1* | 12/2004 | Laberteaux | 370/216 |
| 2005/0068934 A1 | 3/2005 | Sakoda | |
| 2006/0028984 A1 | 2/2006 | Wu et al. | |
| 2006/0203714 A1 | 9/2006 | Wessels et al. | |
| 2006/0206601 A1 | 9/2006 | Shvodian | |
| 2007/0002809 A1 | 1/2007 | Reunamaki et al. | |
| 2007/0106744 A1* | 5/2007 | Bicheno et al. | 709/213 |
| 2007/0133439 A1 | 6/2007 | Promenzio et al. | |
| 2007/0165589 A1 | 7/2007 | Sakoda | |
| 2008/0151848 A1 | 6/2008 | Fischer et al. | |
| 2013/0132502 A1* | 5/2013 | Stacey et al. | 709/208 |
| 2013/0185373 A1* | 7/2013 | Vandwalle et al. | 709/208 |

FOREIGN PATENT DOCUMENTS

| | | |
|---|---|---|
| CN | 101227267 A | 7/2008 |
| CN | 101248624 A | 8/2008 |
| EP | 1 206 070 A2 | 5/2002 |
| JP | 2008-139723 | 5/1996 |
| JP | 2003-158766 | 5/2003 |
| JP | 2007-502567 A | 2/2007 |
| JP | 2007-274707 | 10/2007 |
| JP | 2008-219358 | 9/2008 |
| WO | WO 2010/066194 A1 | 6/2010 |

OTHER PUBLICATIONS

Written Opinion of the International Searching Authority, International Application No. PCT/CN2009/075429, Applicant: Shenzhen Huawei Communication Technologies Co., Ltd., et al., Dated: Mar. 18, 2010, 3 pages.

Extended European Search Report, European Application No. 09831471.9-2413, Applicant: Huawei Device Co., Ltd., Dated: Jul. 25, 2011, 7 pages.

Second Office Action of Chinese Application No. 200810239133.9 mailed May 22, 2013, 12 pages. (Partial Translation).

Chinese Office Action and Translation received in Chinese Application No. 200810239133.9, mailed Aug. 31, 2012, 12 pages.

European Office Action received on Application No. 09831471.9, mailed Sep. 3, 2013, 6 pages.

Japanese Reasons for Rejection received on Application No. 2011-539883, mailed Jul. 30, 2013, 3 pages.

Notice of Reason for Rejection received in Japanese Application No. 2011-539883, mailed Dec. 4, 2012, 4 pages.

* cited by examiner

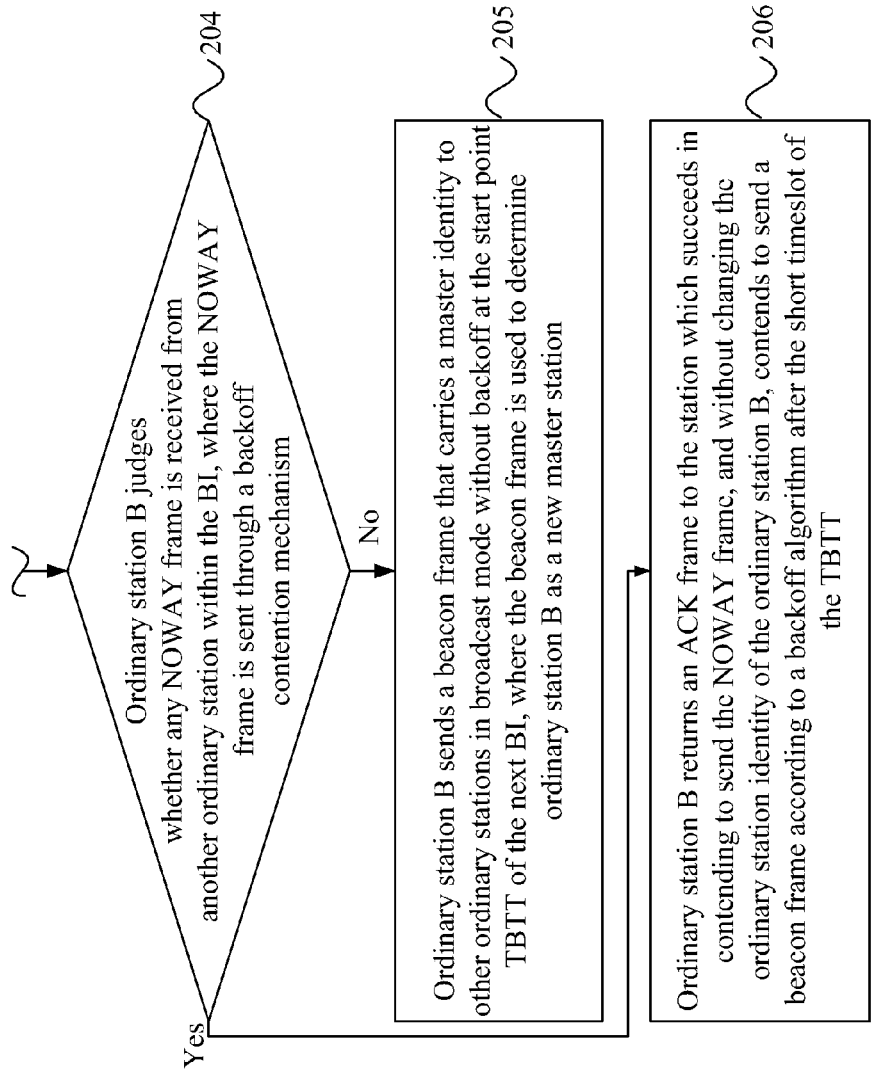

US 8,885,524 B2

METHOD AND APPARATUS FOR NEGOTIATING MASTER STATION

This application is a continuation of International Application No. PCT/CN2009/075429, filed on Dec. 9, 2009, which claims priority to Chinese Patent Application No. 200810239133.9, filed on Dec. 9, 2008, both of which are hereby incorporated by reference in their entireties.

TECHNICAL FIELD

The present invention relates to a network technology free of infrastructure, and particularly relates to a method and an apparatus for negotiating a master station and pertains to the field of communication technologies.

BACKGROUND

An ad hoc network is a Wireless Local Area Network (WLAN) free of wired infrastructure, and the stations in the ad hoc network are wireless application terminals. In an ad hoc network, two application terminals can communicate with each other directly if the two application terminals are located in the communication coverage of each other. Devices in an ad hoc network sometimes need to share or transmit data in a one-to-one or one-to-many manner, and such devices may make up a Peer-to-Peer (P2P) or Device-to-Device (D2D) network of a wireless star structure additionally. Each P2P network needs to possess a master device of this P2P network. To facilitate network management, a master station may be negotiated in those decentralized networks (such as an ad hoc network or a P2P network), and the master station identifies the network and undertakes the tasks of multicasting and forwarding packets and introducing new network stations under certain conditions.

In the process of implementing the present invention, the inventors find at least the following problems in the prior art. The stations in a decentralized network (such as an ad hoc network and a P2P network) can move in the network randomly, which causes the network topology to change constantly; the network stations are generally powered by batteries, and therefore, the network stations are vulnerable to power failure due to deficient power of the batteries, and the master station may be disconnected from the network abruptly anytime without being predictable to other stations. Because the network is unable to know the disconnection of the master station from the network in time, no new master station is negotiated to maintain and manage the network, which affects normal communication between the network stations.

SUMMARY OF THE INVENTION

Embodiments of the present invention provide a method and an apparatus for negotiating a master station. With this method and apparatus, once a master station is disconnected from the decentralized network, the decentralized network can know disconnection of the master station from the network in time, and negotiate a new master station for maintaining and managing the network, without affecting normal communication between stations in the decentralized network.

A method for negotiating a master station according to an embodiment of the present invention includes:
receiving from a master station a management frame that carries a master identity;
obtaining a maximum time interval between receiving of the management frame and receiving of a next management frame from the master station; and
determining, according to a preset policy, a local station itself as a new master station if no more management frame is received after the maximum time interval.

An apparatus for negotiating a master station according to an embodiment of the present invention includes:
a receiving module, configured to receive from a master station a management frame that carries a master identity;
an obtaining module, configured to obtain a maximum time interval between receiving of the management frame and receiving of a next management frame from the master station; and
a negotiating module, configured to determine, according to a preset policy, a local station itself as a new master station if the receiving module receives no more management frame after the maximum time interval obtained by the obtaining module.

It can be known from the foregoing technical solution that, a station other than the master station in the embodiments of the present invention detects whether the master station is disconnected from the network free of central infrastructure (such as an ad hoc network and a P2P network) by judging whether a management frame is received from the master station within the obtained maximum time interval. In this way, once the master station is disconnected from the network free of central infrastructure, the network free of central infrastructure can know disconnection of the master station from the network in time, and negotiate a new master station for maintaining and managing the network, without affecting normal communication between stations in the network free of central infrastructure.

BRIEF DESCRIPTION OF THE DRAWINGS

To make the technical solution of the embodiments of the present invention or the technical solution of the prior art clearer, the following outlines the accompanying drawings involved in the description of the embodiments of the present invention or of the prior art. Apparently, the accompanying drawings outlined below are illustrative and not exhaustive, and persons of ordinary skill in the art can derive other drawings from such accompanying drawings without creative efforts.

FIGS. 2A and 2B are a schematic diagram of a flowchart of a method for negotiating a master station according to a second embodiment of the present invention;

DETAILED DESCRIPTION OF ILLUSTRATIVE EMBODIMENTS

Figure 1:
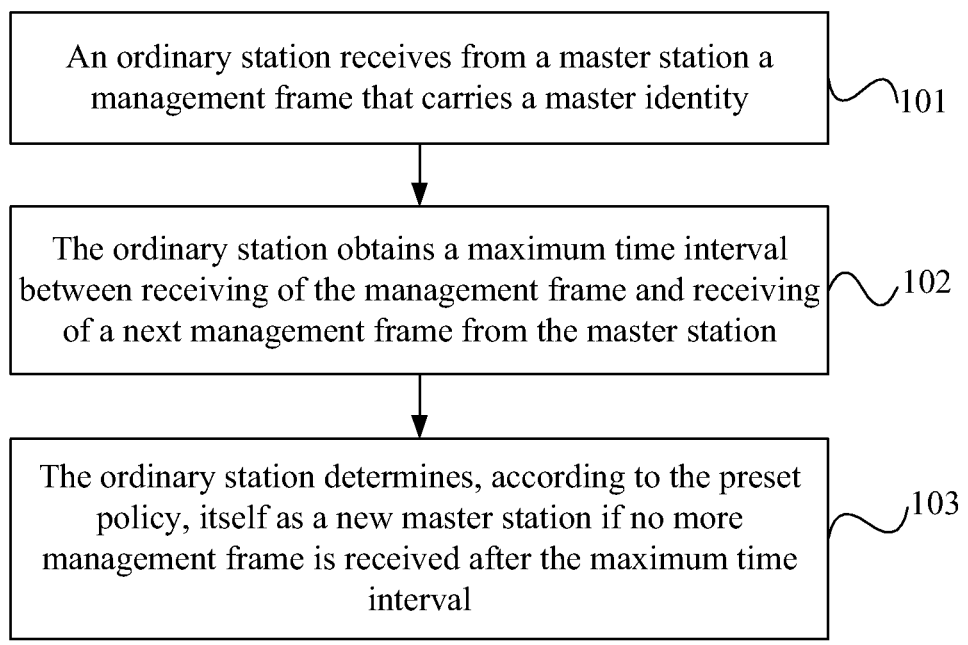
FIG. 1 is a schematic diagram of a flowchart of a method for negotiating a master station according to a first embodiment of the present invention.

The following describes the technical solution of the embodiments of the present invention with reference to the accompanying drawings. Evidently, the embodiments are exemplary only and not exhaustive. All other embodiments, which can be derived by those skilled in the art from the embodiments given herein without creative efforts, shall fall within the protection scope of the present invention.

A decentralized network which has a single Service Set Identifier (SSID), for example, an ad hoc network or a P2P network, is also known as an Independent Basic Service Set (IBSS) network. The time axis of the IBSS network may be divided into equal Beacon Intervals (BIs). An Announcement Traffic Indication Message (ATIM) window exists at the beginning of a BI, and is followed by a contention window. In power-saving mode, all stations receive and transmit beacon frames and ATIM frames periodically through a contention access mechanism within the ATIM window of the BI. The start time of the ATIM window is Target Beacon Transmission Time (TBTT), and all stations keep active within the ATIM window periodically. Each station sets backoff time at the TBTT, and receives and transmits beacon frames through a contention access mechanism. To reduce conflicts, each station obtains a random value within the time range of 0 to Td_max before attempting to send a beacon. Td_max=2*aCWmin*aSlotTime, where aCWmin is a lower limit of a contention window and is an integer, and aSlotTime is a system unit time, namely, timeslot length. That is, each station of the IBSS network starts waiting for a delay period at the TBTT point, and the value of the delay period is a random value between 0 and Td_max. The set delay period descends according to a backoff algorithm. The station whose delay period decreases to zero first sends a beacon frame first. If a station receives a beacon frame from another station before the delay period decreases to zero, the former station does not send its own beacon frame until arrival of the next TBTT.

The contention mechanism for sending beacon frames in the IBSS network is described as follows. The network station recalculates a backoff delay at each TBTT, where the backoff delay falls within the range of 0 to 2*aCWmin*aSlotTime, and sends a beacon frame when the backoff delay decreases to 0. In this way, a station in the network may succeed in contending to send a beacon frame within several consecutive BIs, and some stations may fail to send any beacon frame throughout the several consecutive BIs. Moreover, backoff begins at the TBTT point. When a random value used by an ordinary station is 0, the station may send a beacon frame at the TBTT point, which is unfavorable to reserving the TBTT point for an emergency purpose.

If no ATIM frame exists in the ATIM window, it indicates that no data is available for sending. The station may sleep in power-saving mode after the ATIM window in the BI. If an ATIM frame is received in the ATIM window, it indicates that the sending station has data to be sent; if the ATIM frame is sent in unicast mode, the receiving station needs to return an Acknowledge (ACK) message to the station within the ATIM window. The sending station and receiving station both need to keep active in the contention period after the ATIM window in the BI in order to exchange data with each other. If the sending station has data to be sent, the sending station needs to send an ATIM frame to the receiving station first. After the receiving station returns an ACK frame to confirm that both are active in the BI, the sending station sends the data. If the ATIM frame is multicast or broadcast, the receiving station does not need to return any ACK message to the sending station. The mechanism for sending and receiving an ATIM frame may be partly drawn upon in a new frame that needs to be created in the following embodiment of the present invention.

FIG. 1 is a schematic diagram of a flowchart of a method for negotiating a master station according to a first embodiment of the present invention. As shown in FIG. 1, the method in this embodiment may include the following steps.

Step 101: An ordinary station receives from a master station a management frame that carries a master identity.

Step 102: The ordinary station obtains a maximum time interval between receiving of the management frame and receiving of a next management frame from the master station.

Step 103: The ordinary station determines, according to a preset policy, itself as a new master station if no more management frame is received after the maximum time interval.

In this embodiment, after the ordinary station receives from the master station the management frame that carries a master identity, the ordinary station keeps waiting for the next management frame from the master station. If the ordinary station receives no more management frame after the maximum time interval of receiving the management frame, this ordinary station determines, according to a preset policy, itself as a new master station after negotiating with other ordinary stations. Other stations (ordinary stations) than the master station detect whether the master station is disconnected from the decentralized network (such as an ad hoc network and a P2P network) by judging whether a management frame is received from the master station within the obtained maximum time interval. In this way, once the master station is disconnected from the decentralized network, the decentralized network can know disconnection of the master station from the network, and negotiate a new master station for maintaining and managing the network, without affecting normal communication between stations in the decentralized network.

Figure 2A:
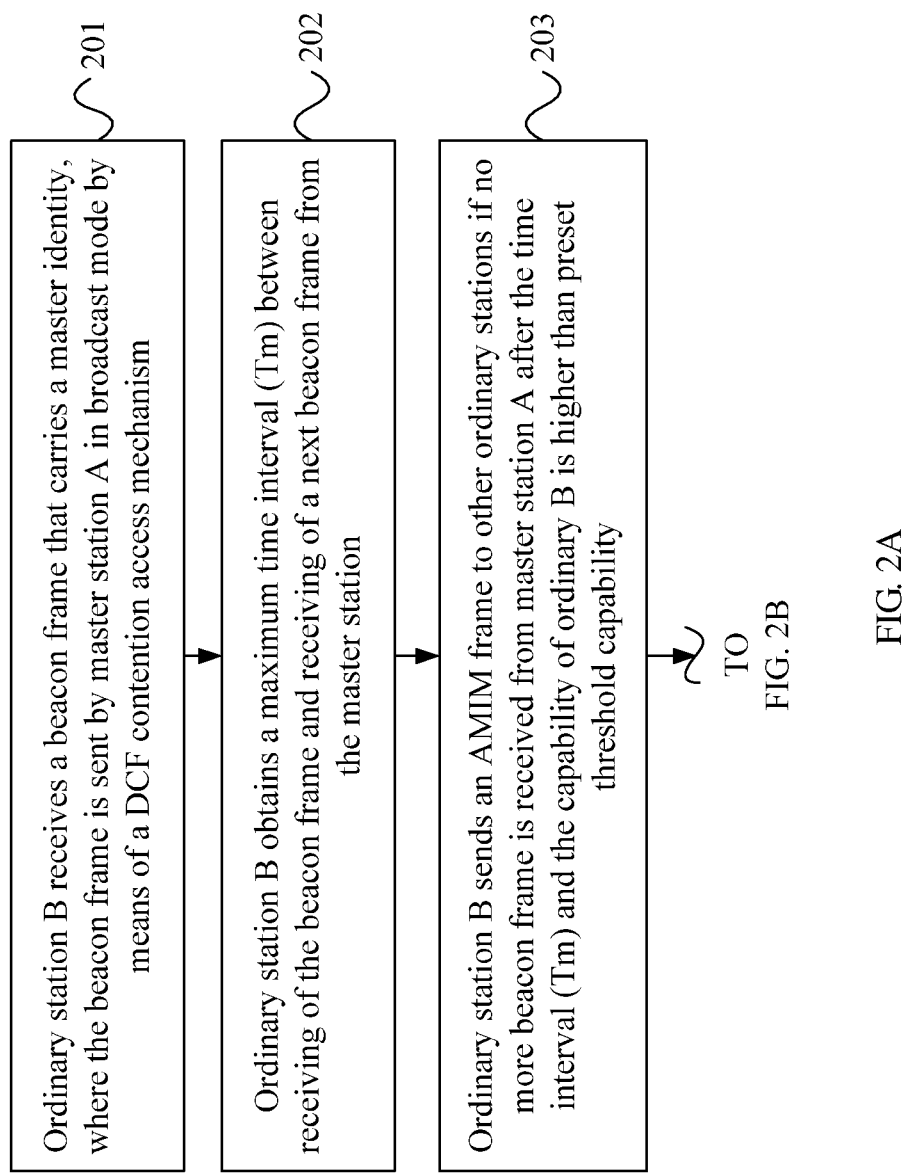

FIGS. 2A and 2B are a schematic diagram of a flowchart of a method for negotiating a master station according to a second embodiment of the present invention. As shown in FIGS. 2A and 2B, the method in this embodiment may include the following steps.

Step 201: Ordinary station B receives a beacon frame that carries a master identity, where the beacon frame is sent by master station A in broadcast or multicast mode by means of a Distributed Coordination Function (DCF) contention access mechanism.

Specifically, the rule of contending to send beacon frames may be: An ordinary station of the network calculates a random backoff delay when being created or added to the network; when the start point (TBTT) of each BI arrives, the ordinary station waits for a short timeslot first, for example, a Short Inter Frame Spacing (SIFS) which is equal to 10 µs or 1 µs, and then contends to send a beacon frame according to the random backoff delay; after receiving a beacon frame from another ordinary station in the BI, the former ordinary station does not recalculate the random backoff delay at the start point (TBTT) of the next BI, but uses the remaining backoff delay of the previous BI; normally, the station sets its beacon contention delay to the upper limit of the backoff delay value range of the whole IBSS network in the next BI after sending the beacon frame in the previous BI successfully.

The beacon frame sent by the master station A carries a master identity, and may carry the current total number (N) of stations in the decentralized network at the time of sending the beacon frame, and may carry sequence $(1, 2, \ldots, N)$ of the stations joining the network. The value of the random backoff delay may be $\text{Random}( )+\log((N-n+1)*\text{aSlotTime})$, where n is the sequence number of the station, and the value of Random( ) falls within the range of 0 to 2*cWmin*aSlotTime.

Step 202: Ordinary station B obtains a maximum time interval (Tm) between receiving of the beacon frame and receiving of a next beacon frame from the master station.

Ordinary station B may determine the maximum time interval Tm according to the current total number (N) of stations in the decentralized network at the time of sending the beacon frame, namely, Tm=N*BI. However, the value of the total number (N) of stations in the decentralized network may change within the maximum time interval Tm. Therefore, a conservative value of Tm is 2*N*BI.

Step 203: If no more beacon frame is received from master station A after the time interval Tm, and, if the control capability of ordinary station B is higher than a preset threshold capability, namely, ordinary station B is competent as a master station, ordinary station B sends an Announcement Master Indication Message (AMIM) frame to other ordinary stations (such as ordinary station C, ordinary station D, . . . ) in multicast or broadcast mode, declaring that ordinary station B becomes a new master station in the network.

This AMIM frame is a management frame, and is capable of declaring as a new master station in the network and letting the sending station keep active in the BI. In addition, the AMIM frame may carry the identity of the sending station B, remaining working time, time of receiving the last beacon frame from the master station A, and control capability of the sending station B.

Specifically, in power-saving mode, the ordinary station B in this step may send an AMIM frame to other ordinary stations in the nearest ATIM window through a DCF contention access mechanism. In non-power-saving mode, the length of the ATIM window is 0. The ordinary station B in this step may send AMIM frames through a DCF contention access mechanism anytime in the BI.

Step 204: The ordinary station B judges whether a NOWAY frame is received within the BI, where the NOWAY frame is sent by other ordinary stations (such as ordinary station C, ordinary station D, . . . ) through a backoff contention mechanism. If the NOWAY frame is received within the BI, the procedure proceeds to step 206; if no NOWAY frame is received within the BI, the procedure proceeds to step 205.

Step 205: The ordinary station B sends a beacon frame that carries a master identity to other ordinary stations (such as ordinary station C, ordinary station D, . . . ) in broadcast mode without backoff (namely, at the TBTT point, with the backoff time being 0) at the start point TBTT of the next BI. The beacon frame is used to determine the ordinary station B as a new master station.

Further, the beacon frame sent by the ordinary station B not only carries a master identity, but also notifies other ordinary stations to change the BI, and publishes a new total number of network stations.

Further, if the ordinary station B receives an AMIM frame from another ordinary station unexpectedly within the BI after sending the AMIM frame, the ordinary station B gives up sending a beacon frame for declaring as a new master station at the TBTT point of the next BI.

Step 206: The ordinary station B returns an ACK frame to the station which succeeds in contending to send the NOWAY frame without changing the ordinary station identity of the ordinary station B, and contends to send a beacon frame according to a backoff algorithm after the short timeslot of the TBTT.

In this embodiment, after an ordinary station (such as ordinary station C) receives an AMIM frame from the ordinary station B, because the station that sends the AMIM frame surely has the control capability higher than the threshold capability, ordinary station C does not answer the ordinary station B if the ordinary station C receives no beacon frame from the master station after the Tm, so as to regard station B as a new master station by default. In power-saving mode, the ordinary station C may sleep in the contention window after the ATIM window, and wake up to receive and send beacon frames in the ATIM window of the next BI (which is still the value specified by the old master station). According to the existing contention mechanism for sending beacons in the IBSS network, the network station recalculates a backoff delay at each TBTT, where the backoff delay falls within the range of 0 to 2*aCWmin*aSlotTime, and sends a beacon when the backoff delay decreases to 0. In this way, a station in the network may succeed in contending to send a beacon within several consecutive BIs, and some stations may fail to send any beacon throughout the several consecutive BIs. Moreover, backoff begins at the TBTT point. When a random value used by an ordinary station is 0, the station can send a beacon at the TBTT point, which is unfavorable to reserving the TBTT point for an emergency purpose. A new contention mechanism for sending beacons in the IBSS network may be specified according to step 201. No matter whether the ordinary station C sleeps within the BI, the ordinary station C is ready for receiving or sending a beacon frame at the TBTT of the next BI. If a beacon frame is received in the short timeslot of the TBTT, the ordinary station C cancels sending of its beacon frame; if no beacon frame is received in the short timeslot of the TBTT, the ordinary station C contends to send the beacon frame according to a backoff algorithm after the short timeslot of the TBTT.

If the ordinary station C receives the beacon frame from the old master station within the BI corresponding to the AMIM frame, it indicates that the ordinary station B fails to receive the beacon frame of the old master station for reasons such as interference, mistakenly regards the old master station as disconnected from the network, and mistakenly declares as a new master station. In this case, the ordinary station C broadcasts a NOWAY frame to ordinary station B and other stations. The NOWAY frame carries no value, so as to reject ordinary station B as a new master station and maintain the current master station. The NOWAY frame is a negative ACK frame paired with the AMIM frame, and is used for negating the sending station of the AMIM frame as a master station. It is a control frame with a high backoff time priority. The NOWAY frame is broadcast through a backoff contention mechanism. If the ordinary station C receives a NOWAY frame broadcast by another ordinary station before sending a NOWAY frame, the ordinary station C cancels the backoff timing of subsequent NOWAY frames, and gives up sending the NOWAY frame. That prevents channel congestion caused by AMIM frames answered by all ordinary stations in the BI simultaneously, and prevents long time spent by the ordinary stations in answering the AMIM frame one by one. If the NOWAY frame is broadcast only once, the sending station of the AMIM frame may fail to receive the NOWAY frame accidentally. Consequently, the sending station of the AMIM frame sends a new beacon without backoff at the start point TBTT of the next BI, and other stations are unable to send beacon frames normally in turn. Therefore, as mentioned in the preceding paragraph, the sending station of the AMIM needs to return an ACK frame to the sending station of the NOWAY frame after receiving the NOWAY frame, indicating that the NOWAY frame is received. Before receiving the ACK frame, the sending station of the NOWAY frame needs to keep sending NOWAY frames to the sending station of the AMIM frame.

Upon receiving a NOWAY frame, the ordinary station B declaring as a master station knows that the ordinary station B itself sends the AMIM frame mistakenly, keeps its ordinary station identity, and contends to send a beacon frame according to a backoff algorithm after the short timeslot of the TBTT. If no NOWAY frame is received, the ordinary station B contends to send a beacon frame without backoff at the TBTT point.

The threshold capability in this embodiment may be stipulated in the specifications formulated by the Wireless Fidelity (WiFi) Alliance. The content of the threshold capability may include the remaining working time and the QoS capability of the station. Because it is stipulated that the station whose capability is lower than the threshold capability is precluded from contending, the station which declares as a new master first is the new master station if no station violates the rule. In this embodiment, the station with the highest control capability is not necessarily the new master station.

In this embodiment, the sending station (ordinary station B) of the AMIM frame needs to keep active in the BI. The AMIM-NOWAY-ACK mechanism in this embodiment may be implemented through other existing frames. For example, the AMIM frame may be combined with the ATIM frame, namely, the ATIM frame which is usually empty carries the master declaration information. After receiving the ATIM frame that carries the master declaration, the station may process the frame in the same way as processing the AMIM frame (it is necessary to stipulate that the sending station of the ATIM frame that carries the master declaration needs to keep active in the contention window after the ATIM window, but the receiving station of the ATIM frame that carries the master declaration may sleep in the contention window after the ATIM window to save energy).

Alternatively, in this embodiment, the ordinary station that receives no beacon frame from the master station after the Tm sends a query to the destination address of the master station, where the query asks whether the master station is disconnected from the decentralized network. If no response is received from the master station, the ordinary station may send an AMIM frame to declare as a new master station. In this way, after the master station is disconnected from the decentralized network, the decentralized network can know disconnection of the master station from the network, and negotiate a new master station for maintaining and managing the network, without affecting normal communication between stations in the decentralized network.

Figure 3:
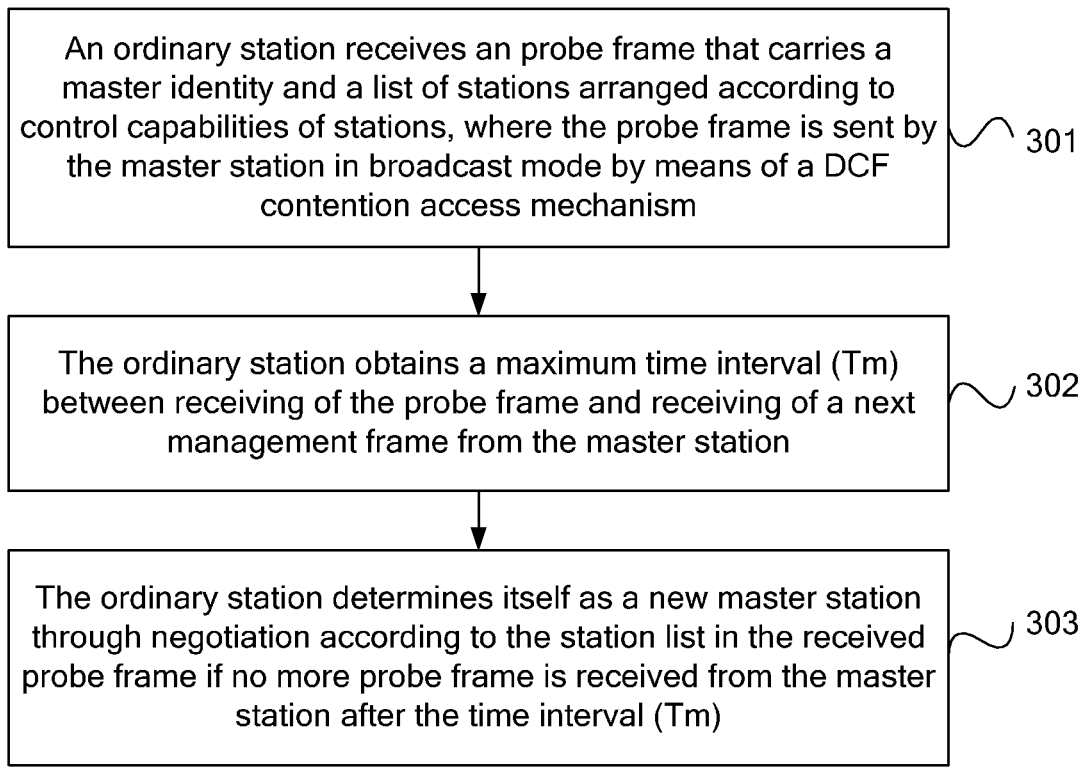
FIG. 3 is a schematic diagram of a flowchart of a method for negotiating a master station according to a third embodiment of the present invention.

FIG. 3 is a schematic diagram of a flowchart of a method for negotiating a master station according to a third embodiment of the present invention. As shown in FIG. 3, the method in this embodiment may include the following steps.

Step 301: An ordinary station receives a probe frame that carries a master identity and a list of stations arranged according to control capabilities of stations, where the probe frame is sent by the master station in broadcast or multicast mode by means of a DCF contention access mechanism.

Step 302: The ordinary station obtains a maximum time interval (Tm) between receiving of the probe frame and receiving of a next probe frame from the master station.

The probe frame sent by the master station in step 301 not only carries a master identity, but also may carry the current total number (N) of stations in the decentralized network at the time of sending the probe frame. In this way, the ordinary station that receives the probe frame in this step can determine the maximum time interval (Tm) according to the total number (N) of stations, namely, Tm=N*BI. However, the value of the total number (N) of stations in decentralized the network may change within the maximum time interval Tm. Therefore, a conservative value of Tm is 2*N*BI.

Step 303: The ordinary station determines itself as a new master station through negotiation according to the station list in the received probe frame if no more probe frame is received from the master station after the time interval (Tm).

If the station list in the probe frame received by the ordinary station in step 301 is arranged in the descending order of the control capability of the station or man-made order, and, if the first ordinary station in the station list receives no second probe frame of the master station within Tm after receiving a first probe frame of the master station in this step, the first ordinary station regards the master station as disconnected from the decentralized network, and sends a query to the destination address of the old master station to ask whether the old master station is disconnected from the decentralized network. If no response is received from the old master station, and a query is received from another ordinary station asking whether the old master station is disconnected from the decentralized network, the ordinary station can send a notification message to other ordinary stations in broadcast or multicast mode to declare as a new master station. In this way, once the master station is disconnected from the decentralized network, the network free of central infrastructure can know disconnection of the master station from the network in time, and negotiate a new master station for maintaining and managing the network, without affecting normal communication between stations in the decentralized network.

Alternatively, in step 301, the probe frames received by the ordinary station may be sent by the master station in broadcast or multicast mode at preset intervals. The time of sending the probe frame is also known as Leader Target Beacon Transmission Time (LTBTT). The LTBTT may be defined as follows (but is not limited to):

1. start time (TBTT) of the ATIM window of each BI, namely, LTBTT=TBTT;

2. start time (TBTT) of the ATIM window after every several BIs, for example, LTBTT=3*BI;

3. a certain time point after the TBTT in the ATIM window of each BI, for example, LTBTT=3*BI+0.1*ATIM; or 4. a certain time point slightly before the TBTT in the ATIM window of each BI, for example, LTBTT=3*BI−0.1*ATIM.

If the preceding first definition or second definition is applied, the master station needs to send the probe frame at the LTBTT with the highest priority; and other stations need to listen to the probe frame at the LTBTT and stop the backoff timing of subsequent probe frames and the frames other than the ATIM frame. If the third definition or fourth definition is applied, all stations need to wake up at the LTBTT. In step 303, if the first ordinary station in the station list receives no probe frame of the old master station at the LTBTT, the first ordinary station believes that the master station is disconnected from the decentralized network, and sends a query to the destination address of the old master station to ask whether the master station is disconnected from the decentralized network. If no response is received from the old master station, but a query is received from other ordinary stations about whether the old master station is disconnected from the decentralized network, the first ordinary station may send a notification message to other ordinary stations in multicast or broadcast mode, declaring as a new master station. In this embodiment, the master station periodically multicasts a probe frame that carries a station list. In this way, the disappearance of the master station is discovered in time, and a new master station is negotiated in time. Once the master station is disconnected from the decentralized network, the decentralized network can know disconnection of the master station from the network in time, and negotiate a new master station for maintaining and managing the network, without affecting normal communication between stations in the decentralized network.

Further, the stations in the station list in this embodiment can be arranged not only according to the control capability of the station, but also according to the remaining battery power of the station. That is, the order of arranging the stations in the list is decided by the control capability of the station and the remaining battery power of the station.

Figure 4:
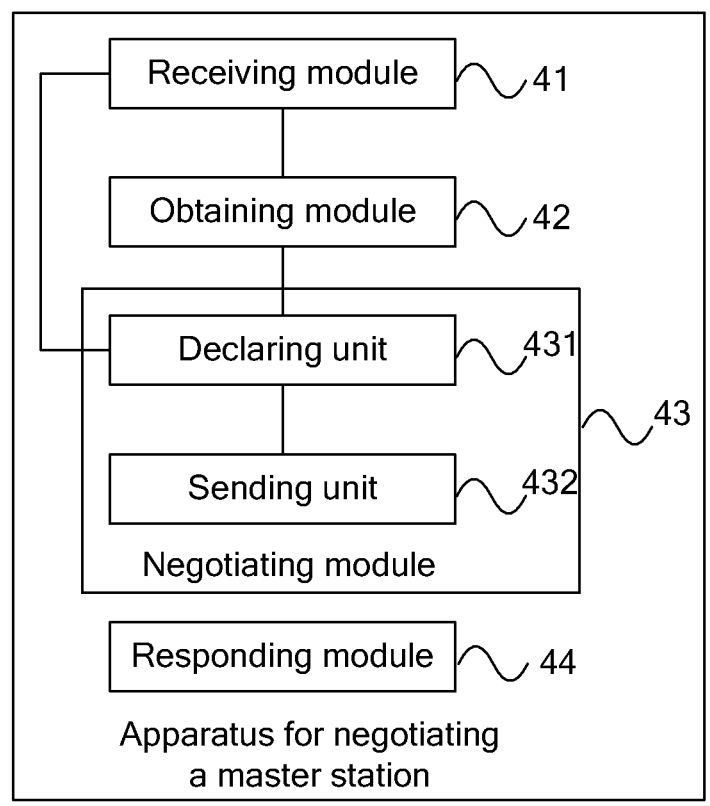
FIG. 4 is a schematic structural diagram of an apparatus for negotiating a master station according to a fourth embodiment of the present invention.

FIG. 4 is a schematic structure diagram of an apparatus for negotiating a master station according to a fourth embodiment of the present invention. As shown in FIG. 4, the apparatus in this embodiment may include a receiving module 41, an obtaining module 42, and a negotiating module 43. The receiving module 41 is configured to receive from a master station a management frame that carries a master identity; the obtaining module 42 is configured to obtain a maximum time interval between receiving of the management frame and receiving of a next management frame from the master station; and the negotiating module 43 is configured to determine, according to a preset policy, a local station itself as a new master station if the receiving module 41 receives no more management frame after the maximum time interval obtained by the obtaining module 42.

The apparatus for negotiating a master station in this embodiment may be regarded as a station. In this embodiment, after the receiving module receives from the master station the management frame that carries a master identity, the receiving module keeps waiting for the next management frame from the master station. If the receiving module receives no more management frame after the maximum time interval between receiving of the management frame and receiving of a next management frame from the master station, the negotiating module negotiates with the negotiating module of other ordinary stations to determine a new master station according to the preset policy.

The management frame in this embodiment may be a beacon frame or probe frame.

Further, in case that the management frame is a beacon frame, the negotiating module 43 in this embodiment may further include a declaring unit 431 and a sending unit 432. The declaring unit 431 is configured to send an AMIM frame to declare as a new master station according to a DCF contention mechanism if the receiving module 41 receives no more management frame after the maximum time interval obtained by the obtaining module 42. The sending unit 432 is configured to send a beacon frame without backoff delay at the start point of the next BI if no NOWAY frame that negates the foregoing declaration is received within the BI, where the beacon frame is used to determine the local station as a new master station.

Further, the apparatus for negotiating a master station in this embodiment may further include a responding module 44, configured to return an ACK message to the sending station of the NOWAY frame after receiving the NOWAY frame that negates the declaration.

Further, in case that the management frame is a probe frame, the probe frame may further carry a list of stations arranged according to the control capability of the station. The negotiating module 43 in this embodiment is further configured to determine, according to the station list, the local station itself as a new master station if the receiving module 41 receives no more probe frame after the maximum time interval obtained by the obtaining module 42.

The negotiating module in other stations (ordinary stations) than the master station detects whether the master station is disconnected from the decentralized network by judging whether the receiving module receives a management frame from the master station within the maximum time interval obtained by the obtaining module. In this way, once the master station is disconnected from the decentralized network, the decentralized network can know disconnection of the master station from the network, and negotiate a new master station for maintaining and managing the network, without affecting normal communication between stations in the decentralized network.

Persons of ordinary skill in the art should understand that all or a part of the steps of the method in the embodiments of the present invention may be implemented by a program instructing relevant hardware. The program may be stored in computer readable storage media. When the program runs, the program executes the steps of the method in the embodiments of the present invention. The storage media may be any media capable of storing program codes, such as a Read Only Memory (ROM), or a Random Access Memory (RAM), a magnetic disk, or a Compact Disk-Read Only Memory (CD-ROM).

Finally, it should be noted that the preceding embodiments are merely provided for describing the technical solution of the present invention, but not intended to limit the present invention. It is apparent that persons skilled in the art can make various modifications, variations, and replacements to the invention without departing from the spirit and scope of the invention. The present invention is intended to cover the modifications, variations, and replacements provided that they fall within the scope of protection defined by the following claims or their equivalents.

What is claimed is:

1. A method for negotiating a master station, the method comprising:
   receiving from the master station a management frame that carries a master identity, wherein the management frame is a first beacon frame sent by the master station according to a Distributed Coordination Function (DCF) contention access mechanism after the master station waits for a short timeslot, wherein, before the receiving from the master station the management frame that carries the master identity, waiting for a short timeslot after arrival of a start point of each Beacon Interval (BI);
   obtaining a maximum time interval between receiving the management frame and receiving a next management frame from the master station; and
   determining, according to a preset policy, a local station as a new master station if no more management frame is received after the maximum time interval, wherein determining the local station as a new master station according to the preset policy comprises:
      sending an Announcement Master Indication Message (AMIM) frame according to the DCF contention access mechanism to declare the local station as a new master station; and
      sending a second beacon frame without backoff delay at the start point of a next BI if no NOWAY frame that negates the declaration is received within the BI, wherein the second beacon frame is used to determine the local station as a new master station.

2. The method according to claim 1, further comprising returning an Acknowledge (ACK) message to a sending station of the NOWAY frame after receiving the NOWAY frame that negates the declaration.

3. The method according to claim 2, wherein the NOWAY frame is sent by a receiving station of the AMIM frame according to a contention access mechanism.

4. The method according to claim 1, wherein sending the AMIM frame according to the DCF contention access mechanism to declare the local station as a new master station comprises:
sending the AMIM frame in a nearest Announcement Traffic Indication Message (ATIM) window in power-saving mode according to the DCF contention access mechanism to declare the local station as a new master station.

5. The method according to claim 2, wherein sending the AMIM frame according to the DCF contention access mechanism to declare the local station as a new master station comprises:
sending the AMIM frame in the BI in non-power-saving mode according to the DCF contention access mechanism to declare the local station as a new master station.

6. The method according to claim 3, wherein sending the AMIM frame according to the DCF contention access mechanism to declare the local station as a new master station comprises:
sending the AMIM frame in a nearest Announcement Traffic Indication Message (ATIM) window in power-saving mode according to the DCF contention access mechanism to declare the local station as a new master station; or
sending the AMIM frame in the BI in non-power-saving mode according to the DCF contention access mechanism to declare the local station as a new master station.

7. The method according to claim 1, further comprising keeping active within the BI in power-saving mode.

8. An apparatus for negotiating a master station, the apparatus comprising:
a receiving module, configured to receive from a master station a management frame that carries a master identity, wherein the management frame is a beacon frame;
an obtaining module, configured to obtain a maximum time interval between receiving of the management frame and receiving of a next management frame from the master station; and
a negotiating module, configured to determine, according to a preset policy, a local station itself as a new master station if the receiving module receives no more management frame after the maximum time interval obtained by the obtaining module, wherein the negotiating module further comprises:
a declaring unit, configured to send an Announcement Master Indication Message (AMIM) frame to declare the local station as a new master station according to a Distributed Coordination Function (DCF) contention access mechanism if the receiving module receives no more management frame after the maximum time interval obtained by the obtaining module; and
a sending unit, configured to send the beacon frame without backoff delay at a start point of a next Beacon Interval (BI) if no NOWAY frame that negates the declaration is received within the BI, wherein the beacon frame is used to determine the local station as a new master station.

9. The apparatus according to claim 8, wherein the apparatus further comprises a responding module, configured to return an Acknowledge (ACK) message to a sending station of the NOWAY frame after receiving the NOWAY frame that negates the declaration.

10. The method according to claim 1, wherein sending the AMIM frame according to the DCF contention access mechanism to declare the local station as a new master station comprises:
sending the AMIM frame in the BI in non-power-saving mode according to the DCF contention access mechanism to declare the local station as a new master station.

11. The method according to claim 2, wherein sending the AMIM frame according to the DCF contention access mechanism to declare the local station as a new master station comprises:
sending the AMIM frame in a nearest Announcement Traffic Indication Message (ATIM) window in power-saving mode according to the DCF contention access mechanism to declare the local station as a new master station; or
sending the AMIM frame in the BI in non-power-saving mode according to the DCF contention access mechanism to declare the local station as a new master station.

12. A method for negotiating a master station, the method comprising:
receiving from the master station a management frame that carries a master identity;
obtaining a maximum time interval between receiving the management frame and receiving a next management frame from the master station; and
determining, according to a preset policy, a local station as a new master station if no more management frame is received after the maximum time interval,
wherein determining the local station as a new master station according to the preset policy comprises:
sending an Announcement Master Indication Message (AMIM) frame according to the DCF contention access mechanism to declare the local station as a new master station; and
sending a first beacon frame without backoff delay at the start point of a next Beacon Interval (BI) if no NOWAY frame that negates the declaration is received within the BI, wherein the first beacon frame is used to determine the local station as a new master station.

13. The method according to claim 12, wherein the management frame is a second beacon frame.

14. The method according to claim 13, wherein the second beacon frame is sent by the master station according to a Distributed Coordination Function (DCF) contention access mechanism after the master station waits for a short timeslot.

15. The method according to claim 14, wherein before the receiving from the master station the management frame that carries the master identity, the method further comprises waiting for a short timeslot after arrival of a start point of each Beacon Interval (BI).

16. The method according to claim 12, further comprising returning an Acknowledge (ACK) message to a sending station of the NOWAY frame after receiving the NOWAY frame that negates the declaration.

17. The method according to claim 16, wherein the NOWAY frame is sent by a receiving station of the AMIM frame according to a contention access mechanism.

18. The method according to claim 12, wherein the management frame is a probe frame.

19. The method according to claim 18, wherein the probe frame is sent by the master station at preset intervals.

20. The method according to claim 19, wherein:
the probe frame further carries a list of stations arranged according to control capabilities of the stations; and
the determining the local station as a new master station according to the preset policy comprises determining the local station as a new master station according to the list of stations.

* * * * *